June 22, 1965 H. F. STAUDENMAYER 3,191,066

SIGNAL SENSING SWITCH WITH SLOW RELEASE

Filed Oct. 9, 1962

INVENTOR.
HAROLD F. STAUDENMAYER
BY
T. L. Styner
ATTORNEY

United States Patent Office 3,191,066
Patented June 22, 1965

3,191,066

SIGNAL SENSING SWITCH WITH SLOW RELEASE

Harold F. Staudenmayer, Rochester, N.Y., assignor to General Dynamics Corporation, Rochester, N.Y., a corporation of Delaware Filed Oct. 9, 1962, Ser. No. 229,443
6 Claims. (Cl. 307—88.5)

This invention relates to a signal responsive switch with fast attack-slow release, and is particularly directed to means for producing an accurate predetermined hang time after cessation of signals.

In two-way point-to-point communication systems where a transmitter and a receiver must operate at each point, it is necessary to disable the transmitter before enabling the receiver. Usually, a switch with a "push-to-talk" button is employed. A voice operated relay, however, is preferred for the switching operation. The relay must respond immediately to the first signal and should hold, or hang, for a measured length of time after cessation of signals so that switching does not occur during ordinary pauses in the normal voice.

An object of this invention is to provide an improved signal operated relay, and, more specifically, to provide a fast attack-slow release relay.

The objects of this invention are attained in a system including a storage condenser normally charged to a fixed predetemined level. The output circuit of a transistor is connected across the storage condenser to immediately discharge the condenser upon the appearance of the first signal voltage at the control electrode of the transistor. Succeeding signal voltage pulses will keep the condenser discharged although a relatively small charging current is continuously applied across the condenser. The charging circuit comprises a direct current voltage source in series with the input impedance of an emitter-follower transistor. The voltage across the load resistance in the common emitter circuit is coupled through a switching diode of the Zener type to a third transistor. In operation, when the pauses between signal pulses are long enough, the condenser charges to a sufficient voltage which, reflected in the output circuit of the second transistor, fires the Zener diode and causes a change of state in the third transistor. The output of the third transistor changes from one steady voltage to another immediately upon receipt of the first signal pulse and holds that state until a signal pause, whereupon, after a measured hang time, the output voltage returns to its original value.

Other features and objects of this invention will become apparent to those skilled in the art by referring to specific embodiments of the invention described in the following specification and shown in the accompanying drawing, in which.

Figure 1:
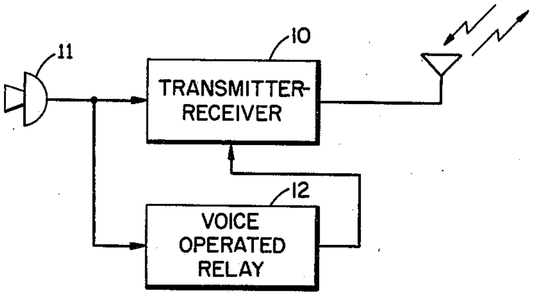
FIG. 1 is a block diagram of a transmitter-receiver operated by the voice operated relay of this invention.

Although the signal operated relay of this invention has many uses, FIG. 1 shows one typical use for the relay. In two-way radio communications, the transmitter-receiver 10 must switch from receiver-to-transmitter mode rapidly when local signals are supplied to the system from the source, such as the microphone 11. Although equipment 10 must convert rapidly from receiver-to-transmitter modes to prevent loss of signal, yet the equipment must not convert from transmitter-to-receiver mode upon normal conversational pauses of the human voice. That is, switching must have a fast attack and a slow release characteristic. The voice operated relay 12, according to this invention, has those characteristics. The relay receives signals from the signal source 11 to effect immediately the receiver-to-transmitter switching and will hold the new mode for a predetermined hang time after cessation of the normal train of signal voltages.

Figure 2:
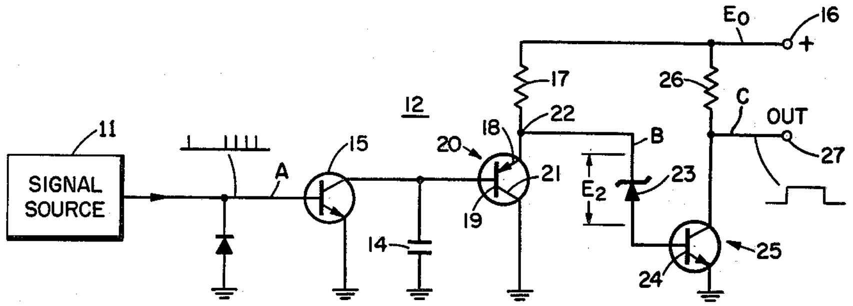
FIG. 2 is a circuit diagram of the voice operated relay of this invention.

In FIG. 2 is shown the circuit of the relay 12 of this invention. Storage condenser 14 is connected across the collector-emitter circuit of transistor 15. The base of transistor 15 is normally biased to cut off that transistor. In the example shown, only positive portions of the signals from source 11 are applied to the base of transistor 15 and the impedances are high and the parameters of the circuits are such that the first positive pulse to arrive drives the transistor into saturation. Saturation current effectively short circuits and instantly discharges condenser 14.

A charging voltage is continuously applied across condenser 14 through a relatively high resistance. The charging circuit comprises a direct current voltage source, the positive terminal of which is connected to terminal 16, the load resistor 17, and the emitter-base circuit 18–19 of transistor 20. Where the transistor is of the PNP type, as shown, the terminal 16 is operated at a positive voltage. The negative terminal of the source would be grounded. The collector 21 is grounded. The voltage of the junction 22, between the load resistor and emitter, reflects the voltage across condenser 14. The voltage at junction 22 in the embodiment shown will vary between some high positive potential near the voltage of source 16, when the output circuit 18–21 of transistor 20 is cut off, and some other voltage near ground potential, when the transistor is turned on. This junction voltage is applied through the switching diode 23, preferably of the breakdown or Zener type, to the control electrode 24 of transistor 25. Transistor 25, as shown, is coupled as an amplifier with collector voltage obtained through load resistor 26, with the emitter grounded, and with output terminal 27 connected to the collector end of the load resistor. In the embodiment shown, transistors 15 and 25 are of the opposite types. That is, if transistor 20 is of the N type, then transistor 25 is of the P type. The Zener diode 23 is selected to have a breakdown, or avalanche voltage, $E_z$, below the voltage, $E_b$, of the source at terminal 16.

In operation, a single positive pulse applied to transistor 15 turns on that transistor which immediately short circuits and discharges condenser 14 and causes high or saturation current to flow in transistor 20. The voltage at junction 22 immediately drops to a low level. As soon as the breakdown voltage of the Zener diode 23, $E_z$, is reached, the diode stops conducting causing transistor 25 to cut off. The voltage at output terminal 27 will then suddenly rise in response to the cutoff of collector-emitter current of transistor 25. Now, as soon as transistor 20 conducts, condenser 14 starts to recharge, the charging rate being a function of the capacity of condenser 14 and the ohmic values of resistance 17 and of the emitter-base circuit of transistor 20. As the charge of condenser 14 rises, the voltage at junction 22 rises toward a higher positive value, approaching $E_b$. The positive voltage at junction 22 will eventually surpass the breakdown voltage, $E_z$, of the Zener diode. The resulting Zener current turns on transistor 25, and the voltage at output terminal 27 drops to its initial value.

The time delay, or hang time, T, between cessation of signals and switching operation of the system just described is defined by $$T=(h_{1e}+B_2R_1)C_1\cdot \log\left(\frac{E_z}{E_b-E_z}\right)$$

where $h_{1e}$ is the common emitter input impedance of transistor 20, $B_2$ is the current gain of transistor 20, $R_1$ is the resistance of resistor 17, $C_1$ is the capacity of condenser 14, $E_z$ is the Zener voltage of diode 23, and $E_b$ is the supply voltage. The term $(h_{1e}+B_2R_1)$ defines the total effective resistance in the charging circuit for condenser $C_1$. This RC time constant is modified, of course, by the log of the Zener voltage across the diode 23 as a fraction of the supply voltage $E_b$. The logarithm, here, is to the base *e*.

Figure 3:
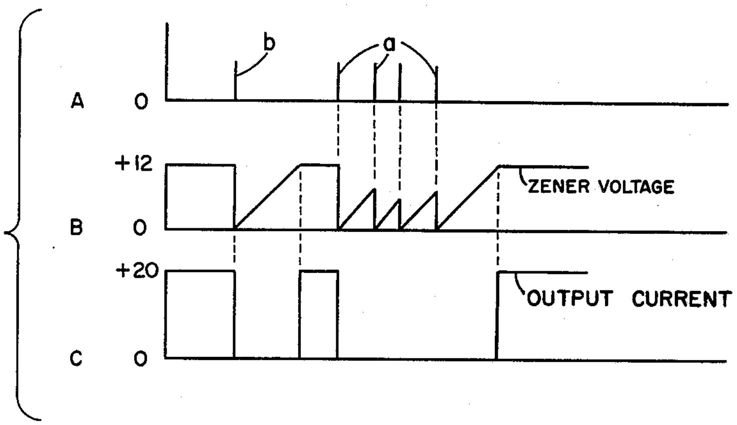
FIG. 3 is a set of waveforms of important voltages of the circuit of FIG. 2.

Referring to FIG. 3, it can be seen that where the signal pulses *a* on line A have less spacing in time than the time constant of the charging circuit, the breakdown voltage of the Zener diode, shown on line B, is not reached and the output current, line C, remains at one stable value. Where, however, a long pause, greater than the mentioned time constant, follows signal pulse *b*, the Zener voltage $E_z$ is exceeded and the relay returns after the measured hang time to its original state. In this example, $E_b$, is assumed to be twenty volts and the Zener voltage is twelve volts.

In one relay that was particularly successful in operation, transistors 15 and 25 were of the commercially obtainable 2N697 type and transistor 20 was of the 2N328 type. Where the load resistors 17 and 26 were each 5000 ohms, the storage condenser 14 was 2.2 microfarads, the supply voltage $E_b$ was twenty volts, and the Zener diode had a breakdown voltage of twelve volts, the hang time was about .500 second, although the attack time was effectively zero.

Many modifications may be made in the circuit constants mentioned without departing from the scope of this invention.

What is claimed is:

1. A fast attack-slow release relay circuit responsive to each increment of a signal voltage, said circuit comprising a normally charged storage condenser, a first transistor with an output circuit, said output circuit being normally cutoff and being connected across said normally charged storage condenser, and said output circuit being capable of saturation current in response to said each increment of said signal voltage to discharge said condenser; a charging circuit connected across said condenser, said charging circuit including in series a voltage source, the input circuit of a second transistor which is biased in the forward direction while said condenser is being charged and a load impedance device; a third transistor with an input circuit, a Zener-type diode, said diode being coupled in said third transistor circuit for applying the voltage across said load impedance device to said third transistor input circuit, said Zener diode having a breakdown voltage intermediate the range of voltages across said load impedance device to drive said third transistor abruptly from one stable state to another whereby to provide relay action as said condenser is, respectively, discharged by said first transistor and charged by said second transistor.

2. A fast attack-slow release signal circuit comprising a normally charged storage condenser, and means responsive to signal pulses for momentarily short-circuiting said condenser, a charging circuit for said condenser including an amplifier with a control electrode, an output electrode and a common electrode, an output electrode-common electrode circuit for said amplifier including a load resistor connected in circuit with said common electrode and a biasing voltage source, the input impedance of said amplifier and said resistor being connected in series between said source and said condenser, means for effectively connecting said output electrode-common electrode circuit to said condenser so that said amplifier is biased in a direction to permit current flow from said source into said condenser until said condenser is substantially charged and so that the voltage across said condenser is reflected in the voltage at the common electrode-end of said resistor, a breakdown switching device of solid-state material having a predetermined switching voltage, said switching voltage being intermediate the range of voltages at the common electrode-end of said resistor, an output circuit connected to said switching device and responsive to current through said switching device.

3. A fast attack-slow release relay comprising a storage condenser, and means responsive to signal pulses for momentarily substantially short-circuiting said condenser, means for charging said condenser, said charging means including a transistor with a control electrode, an output electrode and a common electrode, said common electrode circuit including a load resistor and the input circuit of said transistor being connected across said condenser so that the voltage across said condenser is reflected at the common electrode-end of said resistor, means for biasing said transistor in the forward direction until said condenser is substantially charged including a biasing source connected across the series circuit including said condenser, the control common electrode circuit of said transistor and said resistor; a solid-state switching device having a rated breakdown voltage, said breakdown voltage being intermediate the range of voltages of said common electrode, and an output circuit responsive to current through said switching device.

4. A fast attack-slow release relay comprising a storage condenser, means for normally charging said condenser and means responsive to a signal source for discharging said condenser, said charging means comprising an emitter-follower transistor having a load resistance connected to the emitter thereof, means including a source of bias voltage for biasing said transistor in the forward direction until said condenser is substantially charged, a Zener diode with a predetermined breakdown voltage connected to said emitter and responsive to emitter voltages above and below said breakdown voltage which, respectively turns on and turns off said diode, the time constant for charging said condenser through the input circuit of said transistor being a function of the common emitter input impedance of said transistor, of the current gain of said transistor, of the resistance of said common emitter resistance and of the ratio of said breakdown voltage to said bias voltage source.

5. A fast attack-slow release relay comprising a storage condenser, means responsive to a signal source for discharging said condenser, a charging circuit for said condenser comprising an emitter-follower transistor with an input circuit connected to the base of said transistor and a voltage source connected across said condenser, means including said charging circuit for biasing said transistor in the forward direction until said condenser is substantially charged, a break-down solid-state switch connected across the emitter resistor, the charging time constant, T, of said condenser being defined by $$T=(h_{1e}+B_2R_1)C_1 \cdot \log\left(\frac{E_z}{E_b-E_z}\right)$$

where $h_{1e}$ is the input circuit impedance of said transistor, $B_2$ is the current gain of said transistor, $R_1$ is the resistance of said emitter resistor, $C_1$ is the capacity of said condenser, $E_z$ is the breakdown voltage of said diode, and $E_b$ is the voltage of said bias source.

6. A voice operated squelch circuit for use with a radio including a transmitter and a receiver for substantially instantaneously enabling transmitter operation in response to said voice signals and for inhibiting transmitter operation at a predetermined time after cessation of said voice signals, said circuit comprising (a) a condenser, (b) a first transistor having an emitter-collector circuit connected across said condenser, (c) means for applying said voice signals to said first transistor for rendering said first transistor conductive whereby to substantially instantaneously discharge said condenser through said emitter-collector circuit thereof, (d) a second transistor including a base-collector circuit connected across said condenser, said second transistor also including an emitter-collector circuit, said emitter-collector circuit including a source of operating voltage and a resistor, said emitter-collector circuit being adapted to bias said second transistor in the forward direction until the voltage on the base thereof exceeds the voltage on the emitter thereof, (e) a third transistor having an emitter-collector circuit and having a base, said third transistor emitter-collector circuit providing an output adapted to be connected to said transmitter, and (*f*) a Zener diode connected between said second transistor emitter and said third transistor base, said Zener diode and said source being polarized opposite to each other with respect to said second transistor emitter.

References Cited by the Examiner

UNITED STATES PATENTS

| | | | |
|---|---|---|---|
| 2,719,226 | 9/55 | Gordon et al. | 328—195 |
| 2,892,101 | 6/59 | Bright | 307—88.5 |
| 2,933,623 | 4/60 | Jones | 307—88.5 |
| 2,958,017 | 10/60 | Hoque | 317—148.5 |
| 3,059,129 | 10/62 | Tottingham | 307—88.5 |

ARTHUR GAUSS, *Primary Examiner.*